United States Patent
Igami

(10) Patent No.: US 7,229,103 B2
(45) Date of Patent: Jun. 12, 2007

(54) HEAT EXCHANGER TANK-PIPE CONNECTION STRUCTURE

(75) Inventor: Takaji Igami, Nagoya (JP)

(73) Assignee: T. Rad Co., Ltd, Tokyo (JP)

( * ) Notice: Subject to any disclaimer, the term of this patent is extended or adjusted under 35 U.S.C. 154(b) by 1016 days.

(21) Appl. No.: 10/179,830

(22) Filed: Jun. 25, 2002

(65) Prior Publication Data

US 2003/0234540 A1     Dec. 25, 2003

(51) Int. Cl.
*F16L 5/00* (2006.01)
(52) U.S. Cl. .................... 285/211; 285/382
(58) Field of Classification Search ............ 285/18, 285/321, 136.1, 141.1, 148.22, 148.23, 148.18, 285/148.11, 204, 201, 211, 231, 233, 319, 285/382, 137.11
See application file for complete search history.

(56) References Cited

U.S. PATENT DOCUMENTS

| | | | |
|---|---|---|---|
| 4,347,025 A * | 8/1982 | Long | 411/201 |
| 5,368,340 A * | 11/1994 | Jacobson et al. | 285/136.1 |
| 5,419,042 A | 5/1995 | Kado | |
| 5,524,938 A | 6/1996 | Halder | |
| 5,538,076 A | 7/1996 | Nishida et al. | |

FOREIGN PATENT DOCUMENTS

| | | |
|---|---|---|
| DE | 44 45 091 | 6/1995 |
| DE | 196 48 162 | 11/1996 |
| EP | 0 666 461 | 8/1998 |
| JP | 11-236985 | 8/1999 |
| JP | 2000-320745 | 11/2000 |

* cited by examiner

*Primary Examiner*—Aaron Dunwoody
(74) *Attorney, Agent, or Firm*—Jordan and Hamburg LLP

(57) ABSTRACT

A short cylindrical connection cup is fitted and brazed to a pipe fitting port of a metallic tank. Afterward, the extremity of a resin pipe is inserted via an O-ring into the connection cup, and a caulking claw of the connection cup is caulked to press a flanged portion of the resin pipe.

19 Claims, 5 Drawing Sheets

HEAT EXCHANGER TANK-PIPE CONNECTION STRUCTURE

BACKGROUND OF THE INVENTION

1. Field of the Invention

The present invention relates generally to a heat exchanger having a metallic tank, for cooling automobile engine coolant or for use in an oil cooler, a condenser, etc., and more particularly to a tank-pipe connection structure of such a heat exchanger, where a pipe for fluid entry is projectingly secured to the metallic tank of the heat exchanger.

2. Description of the Related Arts

In cases where the heat exchanger tank is formed from a metal plate of aluminum, etc., the tank includes a pipe connection opening, to which an elongated metal pipe is brazed at its one end. To effect the brazing, parts of the heat exchanger are put together, the resultant assembly is placed in a furnace at a higher temperature. Brazing materials previously coated on the outer surface of the pipe and other parts are fused and then cooled and solidified so that brazing is securely and integrally made between the pipe and the tank and between the parts.

When the assembled heat exchanger is introduced, with a relatively elongated pipe projecting from the tank sidewall, into the high temperature furnace, the furnace tends to have therein a poor holding capacity for the heat exchangers. More specifically, when each heat exchanger has an elongated pipe for fluid entry fairly projecting therefrom, the other heat exchangers need to be held apart from each other within the furnace, making it difficult to house a multiplicity of heat exchangers at one time. This may impair the mass-productivity of the heat exchangers and thus raise the production costs of the heat exchangers.

It may also be troublesome per se to firmly secure the relatively elongated pipe for fluid entry to the tank sidewall previous to brazing.

SUMMARY OF THE INVENTION

It is therefore the object of the present invention to provide a heat exchanger tank-pipe connection structure of the heat exchanger manufactured by in-furnace brazing, capable of increasing the intra-furnace holding capacity as well as reducing the production costs, due to its easy and simple assembling properties.

According to an aspect of the present invention there is provided a heat exchanger tank-pipe connection structure comprising a metallic tank for a heat exchanger, the tank having a circular in section, pipe fitting port; a metallic connection cup having at its extremity a tank inserting portion which is fitted into the pipe fitting port, the connection cup having at its intermediate region a bulging seated portion which is seated against the outer surface of the opening edge of the pipe fitting port, the seated portion being brazed to the pipe fitting port in a liquid-tight fashion, the connection cup having at its rear end a plurality of circumferentially extending caulking slits; a resin pipe having an extremity fitted into the connection cup, with the outer periphery of the fitting portion being formed with an annular recess, the annular recess having at its rear outer periphery an integrally projecting flanged portion; and an O-ring for sealing, the O-ring being fitted to the annular recess of the resin pipe; wherein adjacent portions to the caulking slits of the connection cup are plastically deformed at its rear end to form a caulking portion, the caulking portion having an end face which comes orthogonally into pressure contact with a rear end face of the flanged portion of the resin pipe.

The connection cup optionally has backward from the seated portion a large-diameter portion whose diameter is larger than the diameter of the tank inserting portion, with a notch extending backward from the rear edge of each of the plurality of caulking slits, and the annular recess of the resin pipe may be in the form of a groove, the flanged portion of the resin pipe being fitted into the large-diameter portion.

The connection cup has at its rear end a plurality of circumferentially extending slits, each of the slits and the rear end edge of the connection cup defining a caulking portion therebetween. The resin pipe optionally has an integrally radially outwardly projecting belt-like caulking hold-down portion which confronts the rear end face of the flanged portion at spaces conforming to the belt width of the belt-like caulking portion. The caulking portion is plastically deformed toward the axis of the resin pipe and parallel to the axis.

The connection cup optionally has the seated portion folded back at the intermediate portion outer periphery of the connection cup, the seated portion having a larger diameter than the opening diameter of the pipe fitting port, the connection cup has forward from the seated portion a tank inserting portion which is inserted into the pipe fitting port, the tank inserting portion having an inward flanged portion bent at the extremity edge of the tank inserting portion. The resin pipe in an embodiment has at the extremity edge of the flanged portion the annular recess whose diameter reduces in a shoulder, the intermediate portion and the rear end of the flanged portion conforming to the inner periphery of the connection cup. The O-ring for sealing is press fitted into an O-ring holding portion which is defined by the outer periphery of the annular recess, the inner peripheral surface of the connection cup and the inward flanged portion.

The fore end face of the resin pipe may be seated on the inward flanged portion of the connection cup.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

The present invention will now be described with reference to the accompanying drawings which illustrate a preferred embodiment thereof in a non-limitative manner.

Figure 1:
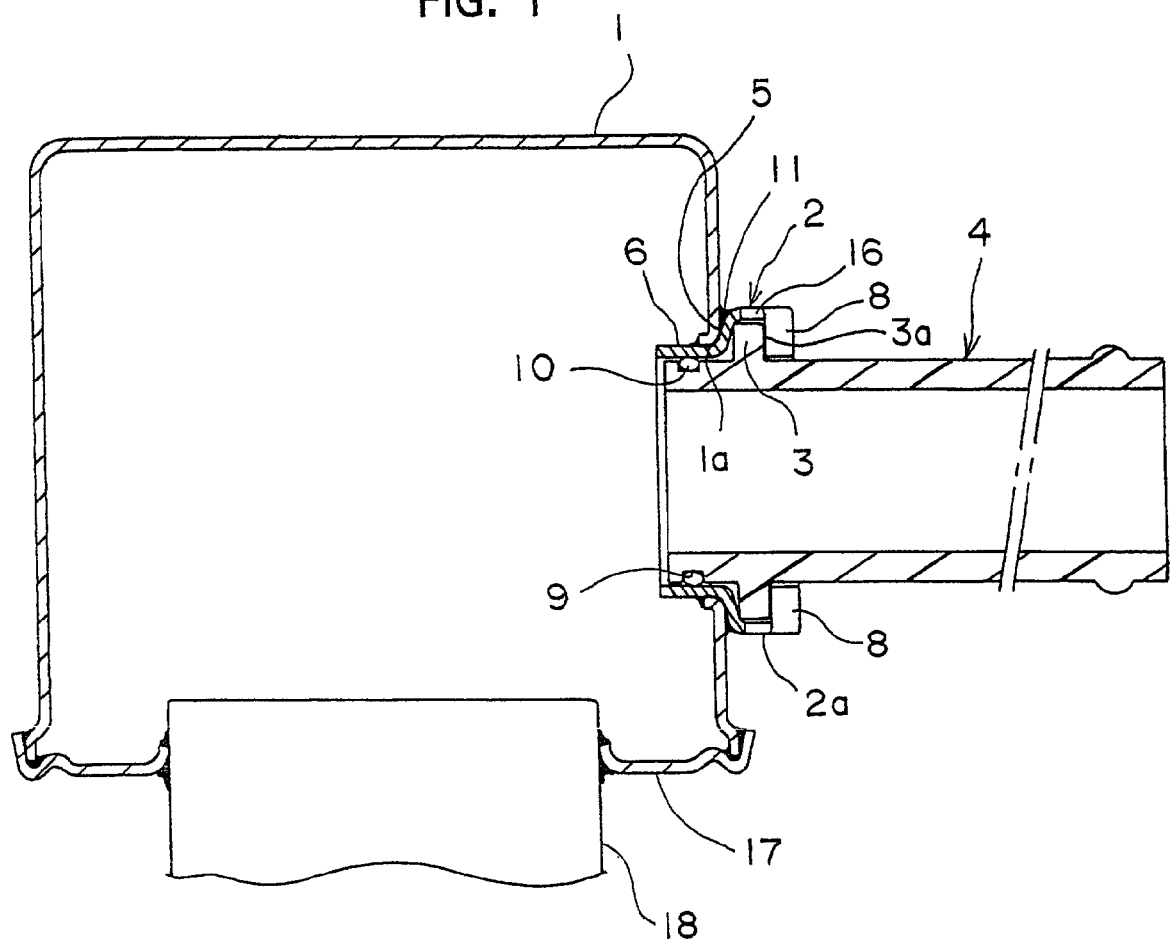
FIG. 1 is a cross-sectional view showing a first embodiment of a heat exchanger tank-pipe connection structure in accordance with the present invention.
Figure 2:
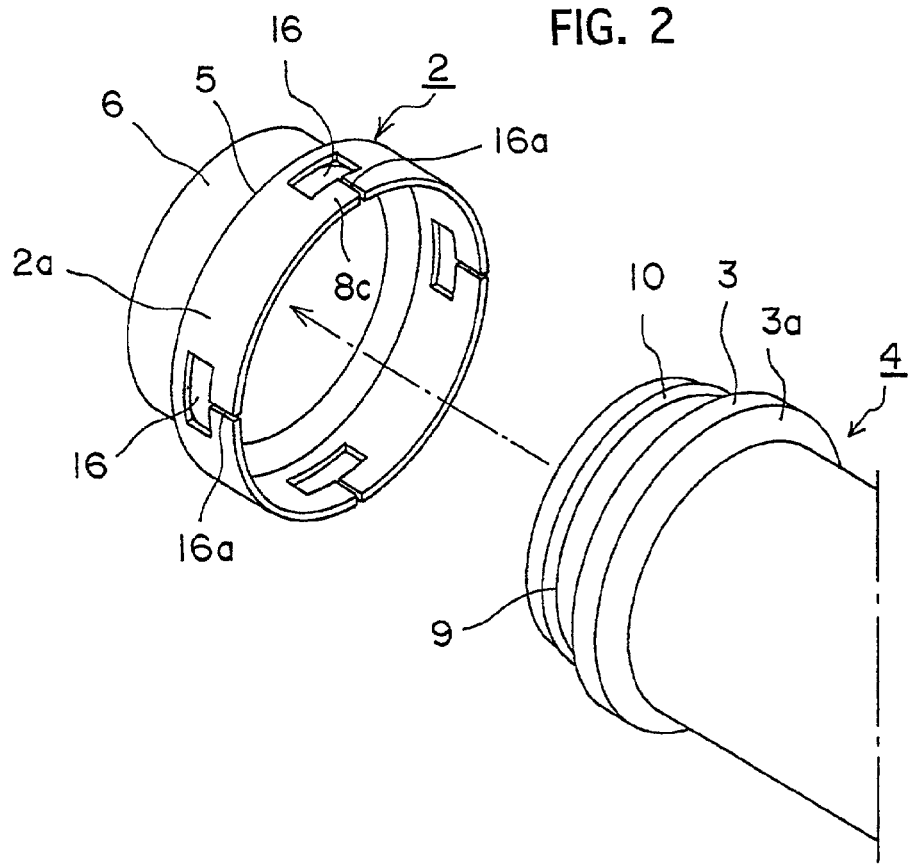
FIG. 2 is an explanatory view showing the status previous to connection between a resin pipe and a connection pipe in the connection structure.
Figure 3:
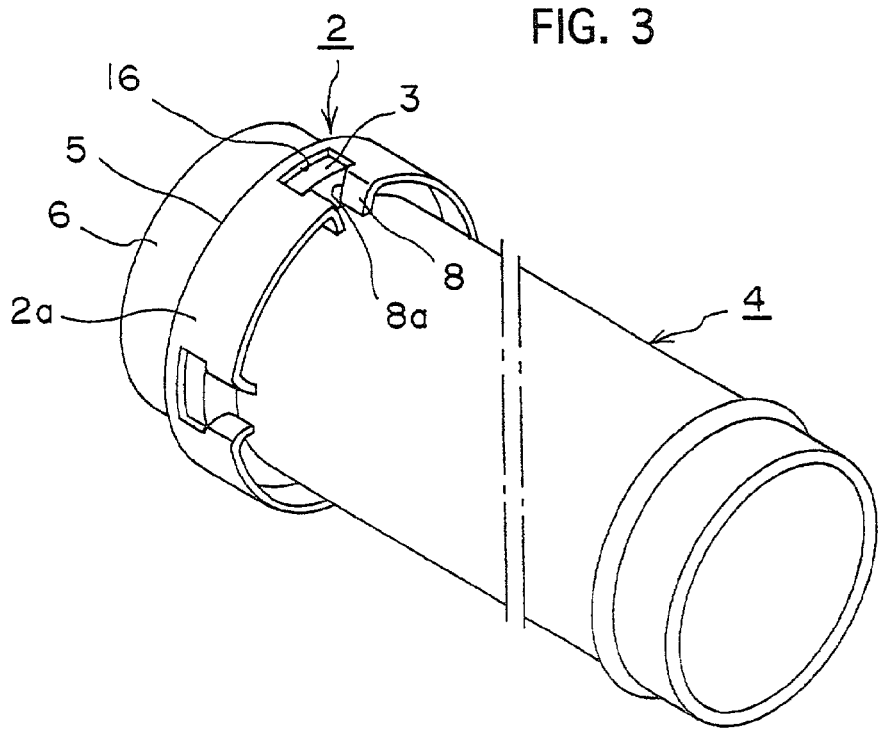
FIG. 3 is an explanatory view showing the status of the connection between the resin pipe and the connection pipe 2.

FIG. 1 is a cross-sectional view showing a first, heat exchanger tank-pipe connection structure in accordance with the present invention, FIG. 2 is an explanatory view showing the status previous to connection between a resin pipe 4 and a connection cup 2, and FIG. 3 is an explanatory view of the status of the connection, with the tank excluded.

This heat exchanger is made of aluminum and available as a radiator for cooling engine coolant and an inter cooler for supercharger. The heat exchanger tank comprises a box-shaped metallic tank 1 having an opening at its one end, and a tube plate 17 blocking the opening end. The tube plate 17 has a multiplicity of flat holes which are juxtaposed, adapted to receive extremities of flat tubes 18. A multiplicity of corrugated fins are disposed between the tubes 18.

The metallic tank 1 has a circular-in section, pipe fitting port 1a which receives the connection cup 2. This connection cup 2 is in the form of a short cylinder with shoulder and is comprised of a tank inserting portion 6 and a large-diameter portion 2a which are integrally formed in an axially spaced manner. The external diameter of the tank inserting portion 6 conforms to the internal diameter of the a pipe fitting port 1a. The large-diameter portion 2a has a larger diameter than that of tank inserting portion 6. The large-diameter portion 2a has a plurality of circumferentially elongated, rectangular slits 16 which are arranged in a circumferentially spaced apart relationship, as shown in FIG. 2. A notch 16a extends between the middle of the slit 16 and the opening edge of the large-diameter portion 2a. A pair of square caulking claws 8c are formed on each side of the notch 16a. The internal diameter of the large-diameter portion 2a conforms to the external diameter of a flanged portion 3 of the resin pipe 4.

The external diameter at the extremity of the resin pipe 4 conforms to the internal diameter of the tank inserting portion 6 of the connection cup 2. The outer periphery at the extremity of the resin pipe 4 is formed with a groove-like annular recesses 9 as shown in FIG. 1, which receives an O-ring 10. The flanged portion 3 is integrally projectingly formed adjacent to the annular recess 9. This resin pipe 4 is formed of a synthetic resin injection molded part.

Figure 7:
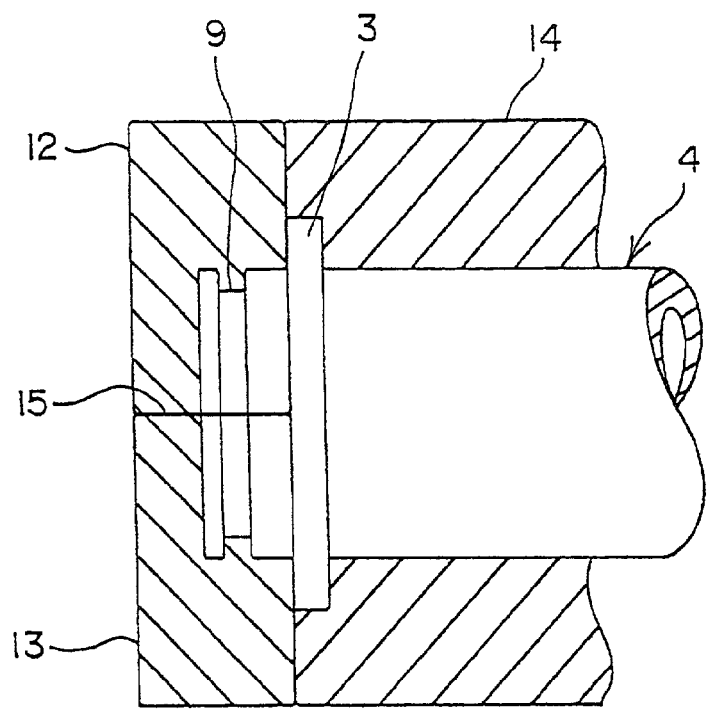
FIG. 7 is an explanatory view of a mold for injection molding of the resin pipe for use in FIG. 1.

A mold shown in FIG. 7 may be used to form such a resin pipe 4. The mold includes, at the site corresponding to the extremity of the flanged portion 3 of the resin pipe 4 as the molded part, a first mold 12 and a second mold 13 to radially divide the outer periphery of the resin pipe 4, and at the site corresponding to the rear end of the flanged portion, a mold 14 which moves in the axial direction. This allows the molded resin pipe 4 to have a parting line at the extremity of the flanged portion 3. Thus, the parting line may be removed by grinding, etc., to improve the sealing properties of the sealing O-ring to be received.

The thus formed heat exchanger parts are put together, with the resin pipe 4 removed, as shown in FIG. 1. At that time, the caulking claw 8c is in the status of FIG. 2.

A clad material covered previously with brazing material is used as at least one outer surface of parts to be joined together. The whole is then assembled, and the assembly is placed in the furnace at a high temperature. At that time, a multiplicity of heat exchanger assemblies are juxtaposed in the direction of thickness of the heat exchangers. The brazing materials on the surfaces of the parts of each assembly are fused and then cooled for solidification to integrally firmly braze the parts of the heat exchanger together, to complete the heat exchangers without pipe.

The extremity of the resin pipe 4 is inserted into the connection cup 2 as shown in FIGS. 2 and 3 such that the flanged portion 3 abuts against the inner surface of a seated portion 5. The caulking claw 8c is then bent toward the center of the connection cup 2 to form a caulking portion 8 so that an end face 8a of the caulking portion 8 presses a rear end face 3a of the flanged portion 3. At that time, the caulking portion 8 is orthogonal to the flanged portion 3.

Figure 4:
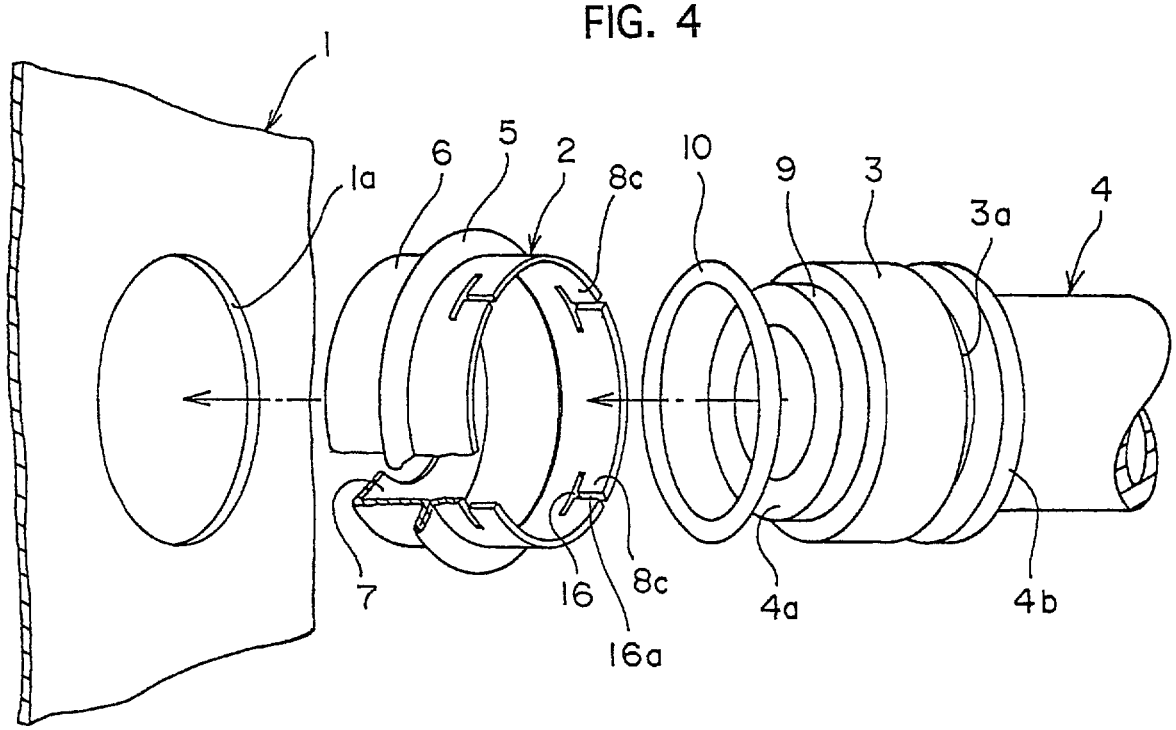
FIG. 4 is a cross-sectional view showing a second embodiment of the heat exchanger tank-pipe connection structure in accordance with the present invention.
Figure 5:
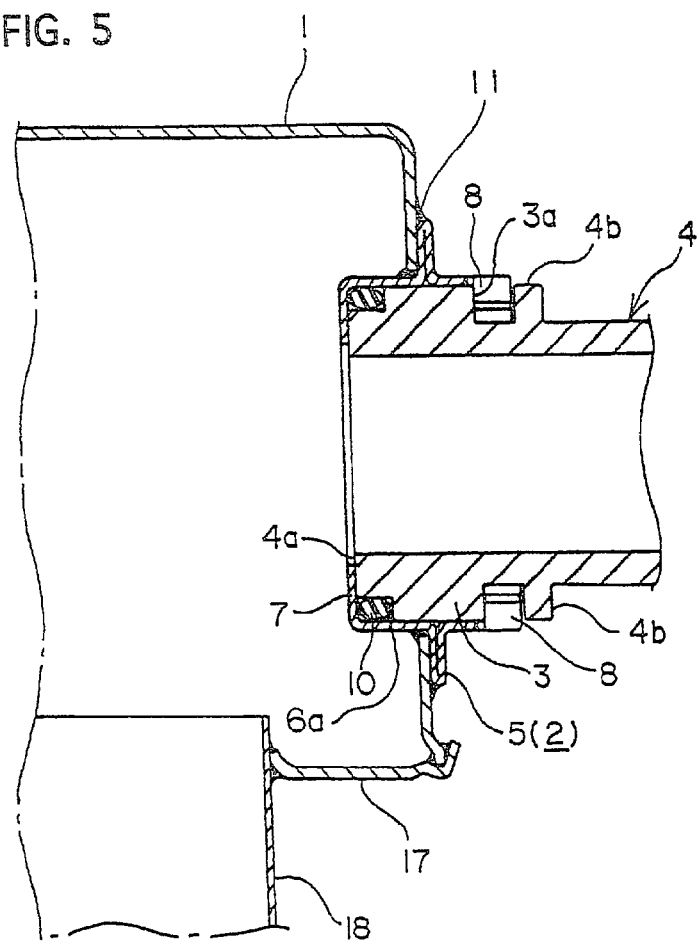
FIG. 5 is a cross-sectional view of the connection structure.

FIG. 4 is an exploded perspective view of a second embodiment of a heat exchanger tank-pipe connection structure of the present invention, and FIG. 5 is a longitudinal sectional view showing the fitting status thereof.

This resin pipe-tank connection structure comprises the metallic tank 1 having the pipe fitting port 1a, an aluminum connection cup 2 brazed to the pipe fitting port 1a in a liquid-tight manner, and a resin pipe 4 having an extremity fitted via the O-ring 10 to the connection cup 2, the resin pipe 4 being caulked by bending the caulking claw 8c of the connection cup 2.

The connection cup 2 as shown in FIG. 4 is folded back at its middle portion outer periphery to form the seated portion 5 of which diameter is larger than the opening diameter of the pipe fitting port 1a. At the extremity of the seated portion 5, the connection cup 2 is provided with the tank inserting portion 6 which conforms to the pipe fitting port 1a and which at its leading edge is bent toward the center to from an inward flanged portion 7. The rear end peripheral edge of the seated portion 5 is formed with a pair of caulking claws 8c each of which is defined by a notch 16a and a slit 16 extending in an inverted T from the rear end edge of the connection cup 2.

The thus configured connection cup 2 as shown in FIG. 5 is brazed to the opening edge of the pipe fitting port 1a of the metallic tank 1 in the same procedure as the above. In addition, brazing is provided to between the metallic tank 1 and the tube plate 17, between the tube plate 17 and the tube 18, and the tube 18 and fins not shown.

The resin pipe 4 as shown in FIGS. 4 and 5 has a flanged portion 3 projecting from its extremity, with the terminal edge of the flanged portion 3 being formed with an annular recess 9 whose diameter is reduced in a shoulder. The outer periphery of the flanged portion 3 conforms to the inner periphery of the connection cup 2.

The resin pipe 4 has a projecting flange-like caulking hold-down portion 4b confronting the rear end face 3a of the flanged portion 3. The interval between the rear end face 3c and the end face of the caulking hold-down portion 4b conforms to the width of the caulking claw 8c of the connection cup 2.

Figure 8:
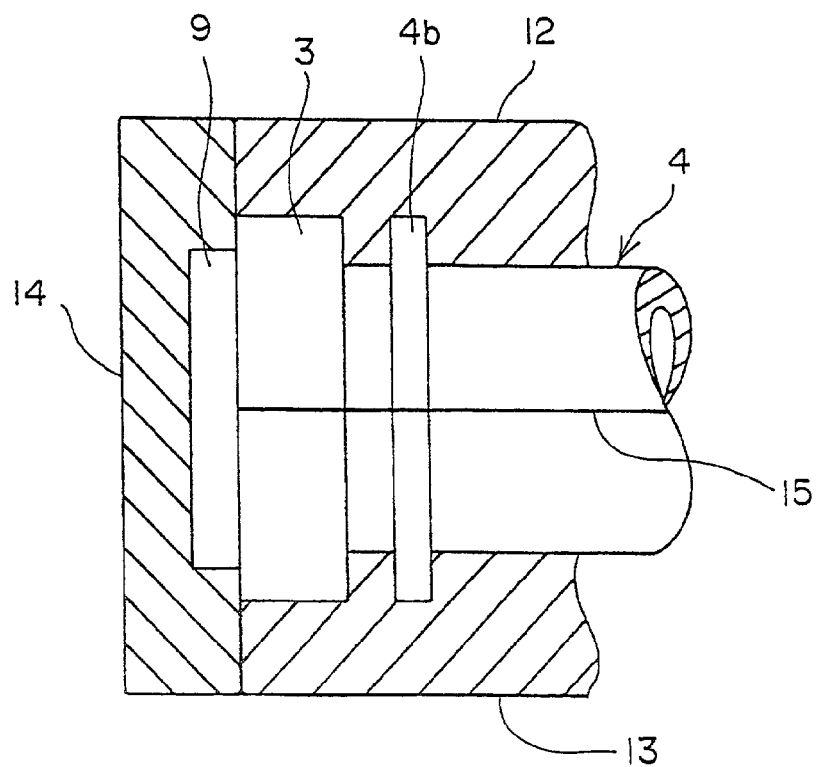
FIG. 8 is an explanatory view of the mold for injection molding of the resin pipe for use in FIG. 5.

A mold for injection molding as shown in FIG. 8 may be used to form such a resin pipe 4. This mold includes a first mold 12 and a second mold 13 which radially divide the outer periphery of the resin pipe 4 excepting its extremity, and a mold 14 located at a site corresponding to the extremity of the resin pipe 4. The resin pipe 4 formed by those molds is free from a parting line which may occur at the annular recess 9 receiving the O-ring for sealing.

Description will then be made of a method of fitting the resin pipe 4. The O-ring 10 is fitted into the annular recess 9 of the resin pipe 4, which in turn is fitted into the connection cup 2. The extremity face 4a of the resin pipe 4 is seated on the inward flanged portion 7, and the caulking claw 8c is bent toward the axis of the resin pipe 4. Thus, the fore end edge of the caulking portion 8 is press fitted to the rear end face 3a of the flanged portion 3, and the rear end edge thereof is brought into contact with or closer to the fore end face of the caulking hold-down portion 4b, to complete the present connection structure.

By virtue of such a construction, the caulking hold-down portion is prevented from rising even though a moment is applied to the resin pipe 4 in FIG. 5, since the caulking portion 8 at its both edges in the width direction is clamped by the rear end face 3a and end face of the caulking hold-down portion 4b.

Figure 6:
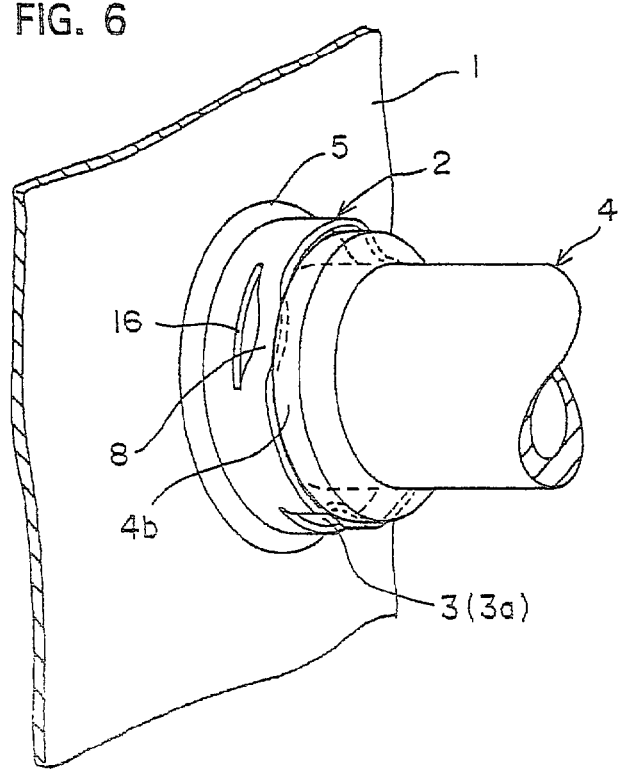
FIG. 6 is a perspective view of a principal part, showing a third embodiment of the heat exchanger tank-pipe connection structure in accordance with the present invention.

FIG. 6 shows a further embodiment of the present invention, which differs from the example of FIGS. 4 and 5 in only the configuration of the caulking portion 8. In this example, the slits 16 at the rear end of the connection cup 2 extend rectilinearly at sites in registration with the flanged portion 3 and are spaced apart at certain intervals. The upper sides of the slits 16 are bent toward the center of the resin pipe 4 such that the extremity edge of the caulking portion 8 presses the rear end face 3a of the flanged portion 3, with the rear end edge of the caulking portion 8 being retained by the fore end face of the caulking hold-down portion 4b.

The heat exchanger tank-pipe connection structure of the present invention enables the short cylindrical connection cup 2 and the metallic tank 1 to be brazed together, with the elongated resin pipe 4 being absent, after which the connection cup 2 can be connected to the resin pipe 4. For this reason, brazing of the heat exchanger is easy to effect and a greater number of heat exchangers can be mass produced at low costs.

Due to its high retaining ability arising from the configuration where the end face 8a of the caulking portion 8 comes orthogonally into pressure contact with the rear end face 3a of the flanged portion 3, a connection structure is obtained which is hard to deform in spite of application of an external force.

According to the structure of the present invention, the caulking hold-down portion 4b is integrally provided confronting the rear end face 3a of the flanged portion 3 of the resin pipe 4, with the interval between the opposite faces conforming to the width of the caulking portion 8 such that the caulking portion 8 is clamped between the rear end face 3a of the flanged portion 3 and the end face of the caulking hold-down portion 4b, thereby more effectively preventing the caulking portion 8 from inadvertently deform, even though the resin pipe 4 is subjected to an external force, thus obtaining a connection structure having a high reliability.

In addition to the above effect, according to the connection structure of the present invention, a higher sealing reliability can be achieved by the O-ring 10.

The connection structure contributes to acquisition of an even higher sealing reliability.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A heat exchanger tank-pipe connection structure comprising:
   a metallic heat exchanger tank having a pipe fitting port formed as an aperture in said metallic heat exchanger tank with a heat tank outer surface annular portion surrounding said aperture;
   a metallic connection cup having at a first end a tank fitted portion fitted into said pipe fitting port, said connection cup having an annular seat of greater diameter than said tank fitted portion, said annular seat being brazed to said heat tank outer surface annular portion in a liquid-tight fashion;
   said connection cup having at a second end a cylindrical portion with a cylindrical portion end surface and inner and outer cylindrical wall surfaces, said cylindrical portion having a plurality of circumferentially extending slits defining circumferentially extending caulking portions between said circumferentially extending slits and said cylindrical portion end surface, said caulking portions having inner edge surfaces formed by said circumferentially extending slits, outer edge surfaces formed by said cylindrical portion end surface, and side surfaces formed of said inner and outer cylindrical wall surfaces;
   a resin pipe having first and second ends, a pipe first end portion fitted into said connection cup, and an outer periphery of said pipe first end portion formed with an annular recess;
   an O-ring fitted to said annular recess of said resin pipe and sealing said resin pipe to said connection cup;
   said resin pipe having a first flange portion projecting radially outward, said first flange portion being disposed on said resin pipe between said annular recess and said second end of said resin pipe, said first flange portion having a front first flange face disposed facing a direction of said annular recess and a rear first flange face facing a direction of said second end of said resin pipe;
   said caulking portions being bent from a cylindrical formation shape radially inward to engage said inner edge surfaces against said rear first flange face with said wall surfaces of said caulking portions oriented orthogonal to said rear first flange face; and
   said resin pipe having a second flange portion projecting radially outward, said second flange portion being disposed on said resin pipe between said first flange portion and said second end of said resin pipe, said second flange portion having a front second flange face disposed facing a direction of said first flange portion and engaging said outer edge surfaces of said caulking portions to retain said caulking portions in engagement with said first flange portion.

2. The heat exchanger tank-pipe connection structure according to claim 1, wherein said cylindrical portion has longitudinally extending slits which extend from said circumferentially extending slits to said cylindrical portion end surface, and said caulking portions are separated by said longitudinally extending slits and have end edges formed by said longitudinally extending slits.

3. The heat exchanger tank-pipe connection structure according to claim 2, wherein said end edges of said caulking portions are engaged into contact with an outer surface of said resin ripe disposed between said first flange portion and said second flange portion when said caulking portions are bent radially inward.

4. The heat exchanger tank-pipe connection structure according to claim 3, wherein said tank fitted portion of said metallic connection cup has an inner surface with a radially inwardly extending flange and said first end of said resin pipe engages said radially inwardly extending flange.

5. The heat exchanger rank-pipe connection structure according to claim 4, wherein said radially inwardly extending flange is disposed at said first end of said metallic connection cup.

6. The beat exchanger tank-pipe connection structure according to claim 5, wherein said annular recess is a shoulder portion at said first end of said resin pipe.

7. The heat exchanger tank-pipe connection structure according to claim 6, wherein said front first flange face adjoins said shoulder portion.

8. The beat exchanger tank-pipe connection structure according to claim 7, wherein said first flange portion has an outer diameter conforming to an inner diameter of said metallic connection cup.

9. The heat exchanger tank-pipe connection structure according to claim 1, wherein said tank fitted portion of said metallic connection cup has an inner surface with a radially inwardly extending flange and said first end of said resin pipe engages said radially inwardly extending flange.

10. The heat exchanger tank-pipe connection structure according to claim 9, wherein said radially inwardly extending flange is disposed at said first end of said metallic connection cup.

11. The heat exchanger tank-pipe connection structure according to claim 10, wherein said annular recess is a shoulder portion at said first end of said resin pipe.

12. The heat exchanger tank-pipe connection structure according to claim 11, wherein said front first flange face adjoins said shoulder portion.

13. The heat exchanger tank-pipe connection structure according to claim 12, wherein said first flange portion has an outer diameter conforming to an inner diameter of said metallic connection cup.

14. The heat exchanger tank-pipe connection structure according to claim 1, wherein said annular recess is a shoulder portion at said first end of said resin pipe.

15. The heat exchanger tank-pipe connection structure according to claim 14, wherein said front first flange face adjoins said shoulder portion.

16. The heat exchanger tank-pipe connection structure according to claim 15, wherein said first flange portion has an outer diameter conforming to an inner diameter of said metallic connection cup.

17. The heat exchanger tank-pipe connection structure according to claim 1, wherein said first flange portion has an outer diameter conforming to an inner diameter of said metallic connection cup.

18. The heat exchanger tank-pipe connection structure according to claim 17, wherein, along a common axis of said metallic connection cup and said resin pipe, said front first flange face is disposed at a first axial position between an axial position of said annular seat of said connection cup and an axial position of said first end of said connection cup, and said rear first flange face is disposed at a second axial position between the axial position of said annular seat of said connection cup and an axial position of said second end of said connection cup.

19. The heat exchanger tank-pipe connection structure according to claim 1, wherein, along a common axis of said metallic connection cup a d said resin pipe, said front first flange face is disposed at a first axial position between an axial position of said annular seat of said connection cup and an axial position of said first end of said connection cup, and said rear first flange face is disposed at a second axial position between the axial position of said annular seat of said connection cup and an axial position of said second end of said connection cup.

* * * * *